(12) United States Patent
Graham et al.

(10) Patent No.: US 6,553,931 B2
(45) Date of Patent: Apr. 29, 2003

(54) VIBRATING FUNNEL FINGERS FOR DISTRIBUTION OF SEASONING ONTO DISCRETE LANES

(75) Inventors: Lawrence Alan Graham, Corinth, TX (US); Larry Douglas Martin, Lake Oswego, OR (US); Todd Charles McNeel, Flower Mound, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/790,057

(22) Filed: Feb. 20, 2001

(65) Prior Publication Data

US 2002/0114871 A1 Aug. 22, 2002

(51) Int. Cl.[7] .............................................. B05C 19/04
(52) U.S. Cl. ........................... 118/13; 118/24; 118/308; 118/310; 118/324; 99/494
(58) Field of Search .............................. 118/13, 24, 308, 118/310, 324; 426/289; 99/494; 222/196, 199, 189.02, 200, 275, 564, 565; 209/314, 354, 920; 141/34, 129

(56) References Cited

U.S. PATENT DOCUMENTS

| 3,988,875 | A |   | 11/1976 | Fay |
|---|---|---|---|---|
| 4,346,802 | A | * | 8/1982 | Popper ........................ 198/533 |
| 4,543,907 | A |   | 10/1985 | Fowler |
| 4,569,446 | A | * | 2/1986 | Kelley ........................ 177/123 |
| 5,090,593 | A |   | 2/1992 | Ejike |
| 5,386,939 | A |   | 2/1995 | Ruegg |
| 5,558,199 | A | * | 9/1996 | Roether et al. .......... 198/461.2 |
| 5,801,387 | A | * | 9/1998 | Nablo et al. ................ 250/398 |
| 5,846,324 | A | * | 12/1998 | Marshall et al. .............. 118/19 |
| 6,145,708 | A | * | 11/2000 | Schmidt ....................... 193/29 |

\* cited by examiner

Primary Examiner—Laura Edwards
(74) Attorney, Agent, or Firm—Carstens, Yee & Cahoon; Colin P. Cahoon

(57) ABSTRACT

An apparatus and method for distributing seasoning on lanes of stackable chip product using a series of vibrating funnel fingers. A narrowed discharge end for each funnel finger is positioned over a lane of chips, thereby directing the seasoning on each chip and limiting the amount of seasoning that must be recycled or discarded. Oscillation of the funnel fingers insures even seasoning distribution on the chips and precludes accumulation of the seasoning on the distribution apparatus.

10 Claims, 2 Drawing Sheets

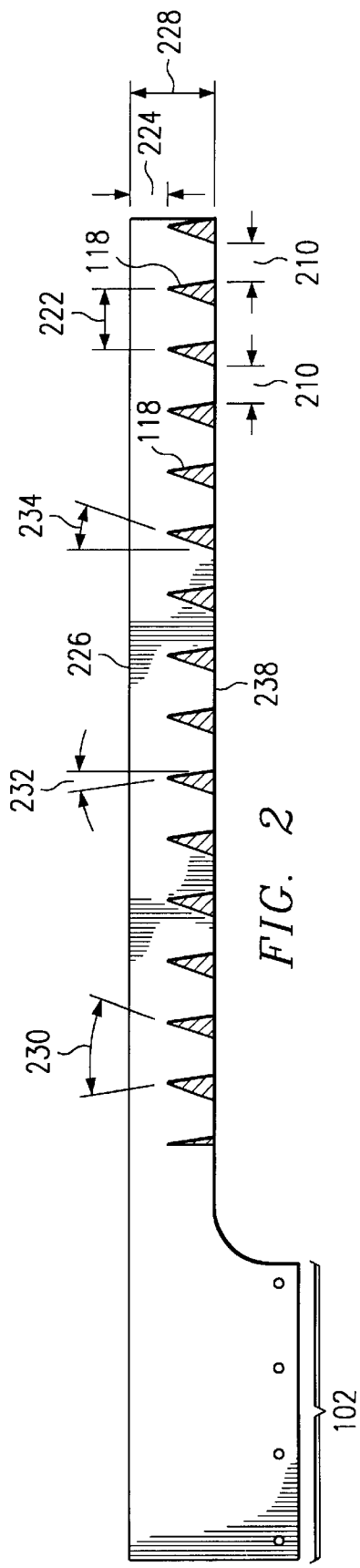
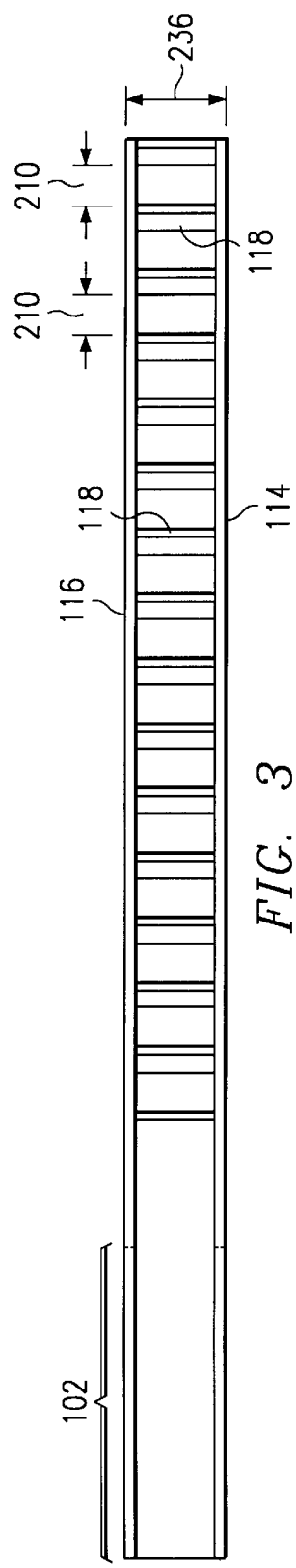

VIBRATING FUNNEL FINGERS FOR DISTRIBUTION OF SEASONING ONTO DISCRETE LANES

BACKGROUND OF THE INVENTION

1. Technical Field

The present invention relates to an apparatus and method for depositing seasoning on a stackable chip product and, in particular, to a series of vibrating funnel fingers for precise direction of the seasoning on the chips traveling tip to tip in discrete lanes down a seasoning conveyor.

2. Description of Related Art

Granular or powdered seasoning is typically added to snack food chips, such as potato chips, tortilla chips, corn chips, and the like, after the product has been cooked and prior to packaging. Such snack food is typically seasoned by sprinkling seasoning of one form or another on the surface of the individual snack items. Examples of this process include seasoning potato chips with salt, barbeque flavoring, cheese flavoring, sour cream flavoring, or vinegar flavoring. A typical barbeque flavoring comprises brown sugar, onion powder, corn syrup solids, and cheddar cheese of various particle sizes. A typical cheese flavoring comprises dehydrated cheese, sugar, cheddar cheese, and cultured milk. A typical sour cream flavoring comprises lactose, sugar, sour cream, cultured cream, cheddar cheese, and onion powder. Such seasonings that contain dehydrated cheese and other cheese products are very hydroscopic, requiring handling in an environment with low humidity and relatively cool ambient temperatures.

The application of granular or powdered seasoning to a chip product is typically accomplished by introducing the unseasoned snack food into a cylindrical seasoning drum or tumbler, as is more fully discussed in, for example, U.S. Pat. No. 5,286,939, U.S. Pat. No. 5,090,593 and U.S. Pat. No. 4,543,907, all of which are directed to an apparatus and method for distributing seasoning on snack food items.

Typically, the seasoning drum is tilted at an inclined angle and is axially rotated at a relatively low rotation speed. The chips are introduced at the more elevated end of the drum. The combination of the tilt and rotation causes the chips to travel continuously down the drum toward an exit at the lower end of the drum. A horizontal, non-rotating seasoning dispenser is extended into the drum for distribution of the granular or powdered seasoning onto the chips while the chips are gently tumbled in the drum. This method of seasoning chips provides an even distribution of the seasoning over the chips in the drum, which are then typically routed to weighers and a form and fill machine for packaging of the chips in flexible containers.

The use of a drum for seasoning chips, however, is not practical when the chip product is intended to be stacked in a container, such as a form fried, stackable potato chip packaged in a cylindrical, tube-like container. As noted in U.S. Pat. No. 3,988,875, directed to an apparatus for producing and packaging food chips, a preferred method for packaging stackable chips involves keeping the chips in a specific orientation in aligned rows throughout the cooking, seasoning, and packaging process. The chips are form-fried and then placed on a conveyor in discrete lanes or columns to proceed for further seasoning and stacking during the packaging process. The use of a seasoning drum for a stacked chip product would require a subsequent orientation step wherein each chip would need to be realigned in lanes with other chips and properly oriented for nested stacking. Additionally, the seasoning drum would introduce a certain amount of product breakage, which is unacceptable in a stacked chip presentation.

In place of a seasoning drum, a seasoning curtain for distributing granular or powdered seasoning onto the chips as they pass below the curtain on a conveyor has been used in the prior art for seasoning stackable chips. After form-frying, the chips travel down a seasoning conveyor oriented in columns. The chips are sprinkled with salt or other seasoning on one side of the chips from a conventional seasoner located above the conveyor. (Because the chips are stacked, it is not necessary to season both sides of the chips. The seasoning applied to the one side of a chip tends to season the opposite side of the next chip stacked on top.) The seasoning conveyor is typically a continuous open-mesh belt which allows any seasoning that is not deposited on a chip to fall through the belt for collection underneath the seasoning conveyor. Depending on the nature of the seasoning applied, the excess seasoning can then be discarded or, preferably, recycled.

The use of a seasoning curtain for distribution of seasoning on stackable chips using such a seasoning conveyor understandably leads to a relatively high volume of excess seasoning falling past the chips and through the conveyor, particularly between the non-occupied space on the conveyor between the chip lanes. Seasoning can be quite expensive, and the disposal of the excess seasoning is not an economic alternative. Unfortunately, the recycling of the excess seasoning can also be problematic. For example, recycling of the seasoning can change the characteristics of the seasoning that is recycled. With handling, the particulate size of the seasoning can change. As noted previously, many seasonings, such as those with cheese ingredients, are very hydroscopic. Recycling and prolonged exposure to ambient conditions, even in a relatively controlled environment, can therefore change the characteristics of such seasoning. There is also the potential that oil absorbed by seasoning that falls off of chips on the seasoning conveyor can change the characteristics of the seasoning. The absorption of either oil or water by the seasoning particles can make the seasoning sticky, therefore subject to lumping together and adhering to the seasoning apparatus. Further, when the characteristics of the seasoning change, either the process must be modified to adjust for such changes, which can affect, among other properties, the adhesion and flavor characteristics of the seasoning, or the seasoning must be discarded.

Consequently, a need exists for a seasoning distribution method and apparatus that evenly distributes powdered or granular seasoning on a stackable chip product while limiting the amount of seasoning that must be either recycled or discarded. Such invention should be easily adaptable to a stackable chip product line so as not to interfered with chip stacking steps. Preferably, such invention should comprise a mechanically simple design capable of operating continuously without the accumulation of seasoning particles on the seasoning apparatus.

SUMMARY OF THE INVENTION

The proposed invention comprises a series of funnel fingers to channel powdered seasonings on chips. The funnel fingers are mounted as a part of a rail that vibrates, thereby promoting even distribution of the seasoning and precluding seasoning from adhering to the funnel fingers. Each individual funnel finger is oriented over a lane of chips and tapers such that the funnel opening immediately above the lane of chips is less than the width of a single chip. In order to minimize wastage between chips, the chips are placed in contact from tip to tip prior to passing below the seasoning funnel fingers.

The proposed invention limits the amount of seasoning that requires recycling or disposal while also insuring a uniform distribution of the seasoning on the chip product. The proposed invention is a mechanically simple design that allows for the continuous distribution of the seasoning without the accumulation of seasoning on the seasoning apparatus. Further, the present invention is easily adaptable to a stackable chip product line in place of a conventional seasoning curtain device.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 2 is a cross-section front view of the seasoning distribution rail; and

FIG. 3 is a top view of the seasoning distribution rail.

DETAILED DESCRIPTION

Figure 1:
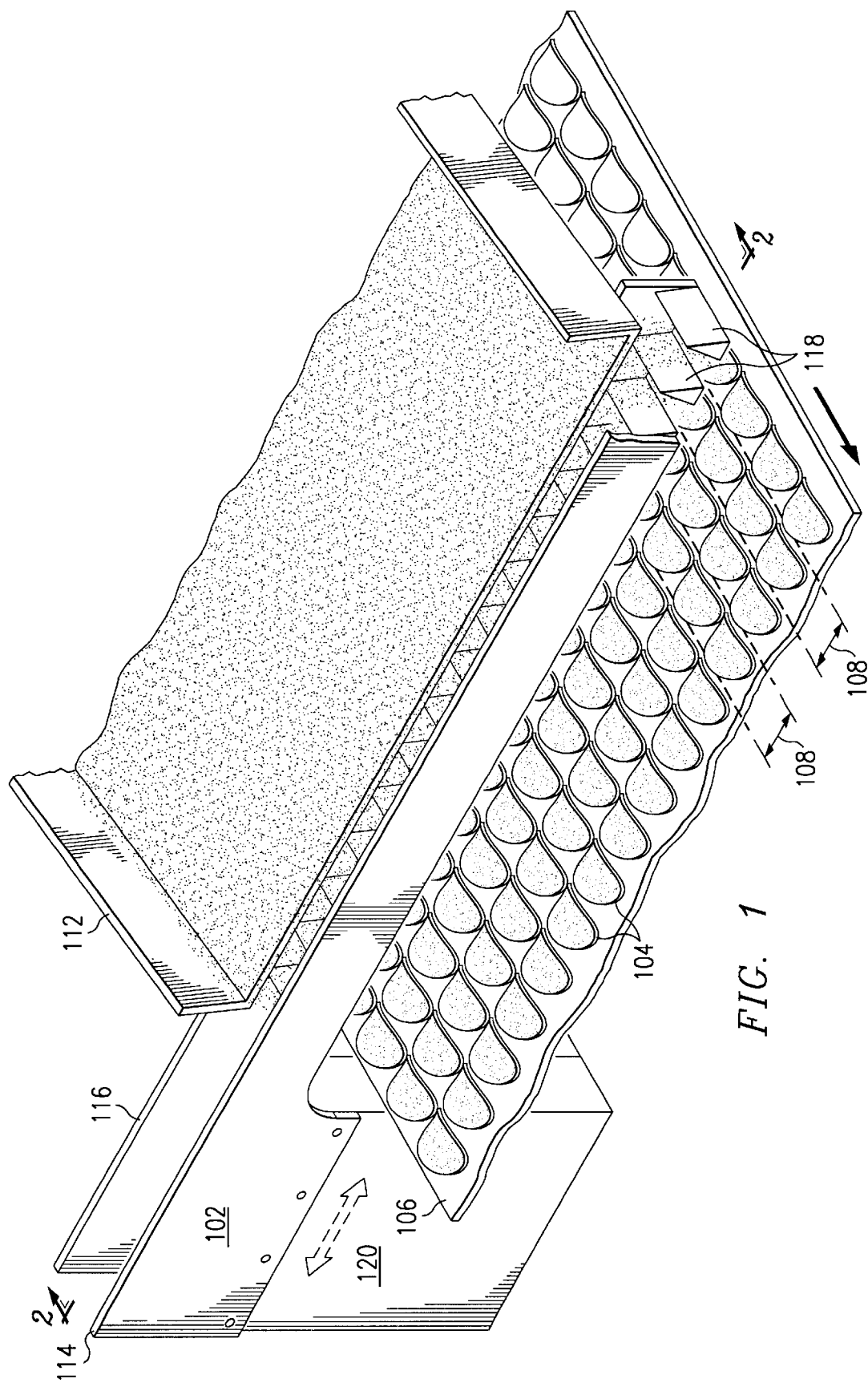
FIG. 1 is a perspective view of the seasoning distribution rail installed above a seasoning conveyor.

FIG. 1 is a perspective view of the seasoning distribution rail or trough 102 of the Applicants' invention suspended above a seasoning conveyor 106. The rail 102, in the embodiment illustrated, comprises two parallel panels 114, 116 and a plurality of dividers 118 which define the funnel fingers of the invention.

The conveyor 106 can be, for example, an open-mesh belt conveyor to allow excess seasoning to fall through the conveyor 106 for collection below, or it can be a conventional belt conveyor with excess seasoning collected at the end of the conveyor 106, as long as the chips maintain their orientation. As with prior art seasoning techniques involving stackable chips, the individual chips 104 travel down the conveyor 106 in discrete lanes 108. For every lane 108 of chips, there is a corresponding opening at the base of the distribution rail 106 (as identified by reference number 210 in FIGS. 2 and 3). As will be described in more detail below, each opening 210, or seasoning lane, is slightly narrower than the width of an individual chip 104. For example, for form-fried potato chips 104 having a width of 1.75 inches, a funnel finger opening 210 of approximately 1.563 inches has been found suitable for the preferred embodiment illustrated and herein described. As the chips 104 pass below the distribution rail 102, seasoning (which is shown in FIG. 1 as small specks) is distributed on the chips 104 from the openings 210 at the base of the rail 102. The chips 104 can be placed tip to tip, as illustrated, in order to further limit the amount of seasoning that does not adhere directly to a chip 104.

Seasoning enters the distribution rail 102 by way of a vibrating trough or scarf plate 112, or other means known in the art such as a hopper. The seasoning then falls between two parallel panels 114, 116 past triangular shaped dividers 118 that define the width of each opening 210 for the funnel finger dimensions. The seasoning distribution rail 102 is attached to a vibratory unit 120. The frequency and amplitude of the vibration imparted by the vibratory unit 120 can be adjusted for each application. For the preferred embodiment described herein, an oscillation frequency in the range of 10 to 60 Hz has been found to be desirable. Such oscillation insures even distribution of the seasoning on the chips 104 and precludes the accumulation of seasoning on the dividers 118 and panels 114, 116. Although the width 210 of the discharge of each funnel finger is less than the width of the chips 104, the oscillation imparts a horizontal velocity on some of the seasoning as it exits the rail 102, thereby spreading the seasoning across the entire exposed surface of the chip 104 despite the concave shape at the edges of the chips.

The dimensions of the distribution rail 102 and its components can be best understood with reference to FIG. 2 (which is a cross-section front view along reference lines 2—2 of FIG. 1) and FIG. 3 (which is an overhead view of the rail 102). Corresponding reference numerals are used to represent corresponding elements throughout all drawings unless otherwise indicated. FIGS. 2 and 3 show fifteen funnel finger openings 210 which are oriented over corresponding chip lanes 108. Each of the funnel fingers, in the embodiment illustrated, is defined by two triangular shaped dividers 118. For the specific preferred embodiment illustrated, these triangular shaped dividers 118 define an opening or receiving end width 222 of each funnel finger of approximately 2.5 inches and a width 210 at the discharge end of each funnel finger of approximately 1.563 inches. The distance 224 from the top of the distribution rail 226 to the top of any single divider 118, in the preferred embodiment shown, is approximately 1.5 inches. Each of the dividers 118 is approximately 2 inches in height, with an overall height 228 of the portion of the distribution rail 102 located over the conveyor 106 of approximately 3.5 inches. This overall height 228 determines the vertical velocity of the seasoning as it departs the funnel fingers. The distance from the bottom of the rail or discharge point 238 from the funnel fingers to the surface of the conveyor 106 shown in FIG. 1 in the embodiment described is approximately 1 inch.

The preferred embodiment illustrated for the application of seasoning on a stackable potato chip product comprises a relative angle 230 between any two triangular dividers of approximately 26°, an angle 232 between the vertical plane and a first side of each triangular divider 118 of approximately 5.5°, and an angle 234 between the vertical plane and a second side of each triangular divider of approximately 20.5°. The difference between the angle 232 on the first side and angle 234 on the second side of each triangular divider 118 compensates for the horizontal velocity imparted on the seasoning as it exits the vibratory trough or scarf plate 112. The angles and dimensions described above, with appropriate oscillation adjustments dependent on the seasoning to be applied, provide for an even distribution, with minimal wastage, of seasoning on a stackable potato chip 104, having a width of 1.75 inches.

FIG. 3 further shows that the width 236 of the rail 102, as measured from the exterior of each panel 116, 114, is approximately 3.5 inches, which, allowing for the thickness of each panel 114, 116, provides for an interior width of approximately 3.25 inches. This particular dimension is not critical to the functionality of the invention. Rather, the interior rail width needs to be wide enough to insure efficient transfer of the seasoning from the scarf plate 112 into the rail 102.

It should be understood that the specific dimensions described above for the preferred embodiment of the invention can vary dramatically depending on the specific application. The height, width, and shape of the dividers 118 can vary greatly. For example, the dividers 118 could have more than one angled surface or have a concave or other appearance on one or both sides. The dimension and shape of the dividers can be optimally adjusted in order to channel a particular seasoning onto a particular product and is also dependent on the nature of the oscillation provided to both the rail 102 and, when applicable, the vibratory scarf plate 112. The number of dividers 118 required is simply dependent on the number of chip lanes 108 on which the seasoning is to be directed. It should be understood by one skilled in the art that any number of embodiments could be developed to accomplish the overall concept of the invention of providing a funneled application of seasoning onto discrete lanes of chips that is oscillated in order to evenly distribute the seasoning as well as discourage seasoning accumulation on the apparatus.

The embodiment disclosed herein is a simple mechanical design that can be easily adapted to existing stackable chip production lines. The seasoning can be applied to product on the conveyor 106 continuously, as seasoning will not accumulate on the rail 102 and its components because of the oscillation applied by the oscillation device 120. The oscillation further evenly distributes the seasoning on the chips as they pass below each funnel finger. The result is an apparatus and method for distributing seasoning on stackable chip products that greatly reduces the amount of seasoning that is recycled.

While the invention has been particularly shown and described with reference to a preferred embodiment, it will be understood by those skilled in the art that various changes in form and detail may be made therein without departing from the spirit and scope of the invention.

What is claimed is:

1. An apparatus for distributing seasoning on lanes of chips transported on a conveyor, said apparatus comprising:
   a first vertical panel;
   a second vertical panel oriented parallel to said first vertical panel; and
   a plurality of discretely spaced vertical dividers, wherein said vertical dividers are parallel to each other and further separated from each other via an outlet positioned to discharge seasoning over a lane of chips, and wherein each of said vertical dividers is perpendicularly attached to said first and second vertical panels, thereby forming funnel fingers between said panels.

2. The apparatus of claim 1 wherein said panels oscillate.

3. The apparatus of claim 2 wherein said oscillation is in a frequency range of 10 Hz to 60 Hz.

4. The apparatus of claim 1 wherein said funnel fingers are oriented to discharge seasoning over said lanes of chips.

5. The apparatus of claim 1 wherein said vertical dividers comprise a triangular shape.

6. The apparatus of claim 1 wherein the heights of said dividers effect the vertical velocity of seasoning distributed from said apparatus.

7. The apparatus of claim 4 wherein the discharge end of said funnel fingers are selected to be is narrower than the width of said chips.

8. The apparatus of claim 1 wherein each outlet comprises a receiving end and a discharge end, wherein said discharge end is narrower than said receiving end.

9. The apparatus of claim 8 wherein said discharge end is narrower than the width of said chips.

10. The apparatus of claim 8 wherein the dimensions of said dividers are selected to compensate for any horizontal velocity of seasoning distributed from said apparatus.

\* \* \* \* \*